(12) United States Patent
Fan et al.

(10) Patent No.: US 12,048,910 B2
(45) Date of Patent: Jul. 30, 2024

(54) VERTICALLY ORIENTED PLASMA REACTOR

(71) Applicant: Board of Trustees of Michigan State University, East Lansing, MI (US)

(72) Inventors: Qi Hua Fan, Okemos, MI (US); Martin E. Toomajian, Brighton, MI (US); Thomas Schuelke, Pinckney, MI (US)

(73) Assignee: Board of Trustees of Michigan State University, East Lansing, MI (US)

( * ) Notice: Subject to any disclaimer, the term of this patent is extended or adjusted under 35 U.S.C. 154(b) by 849 days.

(21) Appl. No.: 17/258,881

(22) PCT Filed: Jul. 11, 2019

(86) PCT No.: PCT/US2019/041355
§ 371 (c)(1),
(2) Date: Jan. 8, 2021

(87) PCT Pub. No.: WO2020/014448
PCT Pub. Date: Jan. 16, 2020

(65) Prior Publication Data
US 2021/0291138 A1    Sep. 23, 2021

Related U.S. Application Data

(60) Provisional application No. 62/696,562, filed on Jul. 11, 2018.

(51) Int. Cl.
*B01J 19/08* (2006.01)
*B01J 19/00* (2006.01)
(Continued)

(52) U.S. Cl.
CPC .......... *B01J 19/088* (2013.01); *B01J 19/006* (2013.01); *B01J 20/20* (2013.01); *B01J 20/3416* (2013.01);
(Continued)

(58) Field of Classification Search
CPC ........ B01J 19/088; B01J 19/006; B01J 20/20; B01J 20/3416; B01J 2219/0864; H05H 1/466; C01B 32/366
(Continued)

(56) References Cited

U.S. PATENT DOCUMENTS 4,892,633 A    1/1990  Welty
5,026,466 A    6/1991  Wesemeyer et al.
(Continued)

FOREIGN PATENT DOCUMENTS

WO   WO-2004013661 A2 *  2/2004  ............. G01B 11/14
WO   WO-2011/097183 A2    8/2011
(Continued)

OTHER PUBLICATIONS

Hopwood, J., et al., "Langmuir probe measurements of a radio frequency induction plasma," Journal of Vacuum Science & Technology A: Vacuum, Surfaces, and Films, 1993.
(Continued)

*Primary Examiner* — Stephen M Gravini
(74) *Attorney, Agent, or Firm* — Harness, Dickey & Pierce, PLC

(57) ABSTRACT

A vertically oriented plasma reactor is provided. In another aspect, a plasma reactor includes a vertically elongated vacuum chamber, a wall internally projecting within a middle section of the housing, magnets, electrodes and a radio frequency source. A further aspect employs a workpiece-entry port and an opposite workpiece material-exit port, with one located adjacent a top end and the other
(Continued)

adjacent a bottom end of a vertically elongated reactor housing or vacuum chamber. Yet another aspect employs a moving or falling-bed plasma reactor for use in activating biochar material.

28 Claims, 7 Drawing Sheets

(51) Int. Cl.
*B01J 20/20* (2006.01)
*B01J 20/34* (2006.01)
*C01B 32/366* (2017.01)
*H05H 1/46* (2006.01)

(52) U.S. Cl.
CPC ........... *C01B 32/366* (2017.08); *H05H 1/466* (2021.05); *B01J 2219/0894* (2013.01)

(58) Field of Classification Search
USPC .......................................................... 34/249
See application file for complete search history.

(56) References Cited

U.S. PATENT DOCUMENTS

| | | |
|---|---|---|
| 5,032,202 A | 7/1991 | Tsai et al. |
| 5,246,532 A | 9/1993 | Ishida |
| 5,346,579 A | 9/1994 | Cook et al. |
| 5,380,420 A | 1/1995 | Tsuji |
| 5,415,754 A | 5/1995 | Manley |
| 5,505,780 A | 4/1996 | Dalvie et al. |
| 5,731,046 A | 3/1998 | Mistry et al. |
| 5,972,185 A | 10/1999 | Hendricks et al. |
| 5,976,308 A | 11/1999 | Fairbairn et al. |
| 5,988,103 A | 11/1999 | Fetherston et al. |
| 6,740,212 B2 | 5/2004 | Fan et al. |
| 7,879,203 B2 | 2/2011 | Weaver et al. |
| 8,316,797 B2 | 11/2012 | Asmussen et al. |
| 8,387,561 B2 | 3/2013 | Weaver et al. |
| 8,668,962 B2 | 3/2014 | Asmussen et al. |
| 8,911,868 B2 | 12/2014 | Scheibe et al. |
| 9,139,909 B2 | 9/2015 | Asmussen et al. |
| 9,496,376 B2 | 11/2016 | Yamazaki et al. |
| 9,754,733 B2 | 9/2017 | Fan et al. |
| 2003/0150562 A1 | 8/2003 | Quon |
| 2007/0034501 A1 | 2/2007 | Bender |
| 2011/0073471 A1 | 3/2011 | Weaver et al. |
| 2011/0140367 A1 | 6/2011 | Shi |
| 2011/0277823 A1 | 11/2011 | Fan et al. |
| 2013/0209767 A1 | 8/2013 | Kolev et al. |
| 2013/0244293 A1 | 9/2013 | Balan et al. |
| 2013/0306495 A1 | 11/2013 | Smith, Jr. |
| 2013/0307414 A1 | 11/2013 | Choi |
| 2013/0316156 A1 | 11/2013 | Kennedy et al. |
| 2014/0238861 A1 | 8/2014 | Foret |
| 2014/0260955 A1 | 9/2014 | Aharonov |
| 2014/0313574 A1 | 10/2014 | Bills et al. |
| 2015/0041454 A1 | 2/2015 | Foret |
| 2015/0068113 A1 | 3/2015 | Conner et al. |
| 2015/0203777 A1 | 7/2015 | Ramm et al. |
| 2015/0274567 A1 | 10/2015 | Boughton |
| 2015/0307360 A1 | 10/2015 | Bills et al. |
| 2015/0369426 A1 | 12/2015 | Smith, Jr. |
| 2016/0076141 A1 | 3/2016 | Hirota |
| 2016/0090535 A1 | 3/2016 | Abdullah et al. |
| 2016/0215111 A1 | 7/2016 | Bilek et al. |
| 2016/0245224 A1 | 8/2016 | Ruona et al. |
| 2016/0322174 A1 | 11/2016 | Fan et al. |
| 2016/0351404 A1 | 12/2016 | Aramaki et al. |
| 2017/0166753 A1 | 6/2017 | Slagter et al. |
| 2017/0189877 A1 | 7/2017 | Abdullah et al. |
| 2019/0366298 A1 | 12/2019 | Fan et al. |
| 2021/0291138 A1* | 9/2021 | Fan ........................ B01J 19/006 |
| 2024/0082811 A1* | 3/2024 | Fan .......................... B01J 3/006 |

FOREIGN PATENT DOCUMENTS

| | | | |
|---|---|---|---|
| WO | WO-2017/209632 A1 | 12/2017 | |
| WO | WO-2018/175689 A1 | 9/2018 | |
| WO | WO-2020014448 A1 * | 1/2020 | ............ B01J 19/006 |

OTHER PUBLICATIONS

Dehkhoda, AM, et al., "A novel method to tailor the porous structure of KOH-activated biochar and its application in capacitive deionization and energy storage," Biomass and Bioenergy, 2016.
Talukder, A-A, "Plasma treatment of zinc oxide thin film and temperature sensing using the zinc oxide thin film," <https://openprairie.sdstate.edu/cgi/viewcontent.cgi>?article=2048&context= etd, 2016.
Foggiato, J., "Handbook of Thin-Film Deposition Processes and Techniques, Second Edition—Chapter 3: Chemical Vapor Deposition of Silicon Dioxide Films," Noyes Publications, 2002, 54 pages.
Gabriel, O., et al., "Plasma monitoring and PECVD process control in thin film silicon-based solar cell manufacturing," EPJ Photovoltaics 5, Feb. 5, 2014, 9 pages.
Henkel, C. et al., "Deposition of dielectrics and metal gate stacks (CVC, ALD), Lecture 8," KTH, Spring 2013, 57 pages.
Menendez, A., et al., "Depositions of Thin Films: PECVD Process," Silicon Based Thin Film Solar-Cells, 2013, pp. 29-57.
Talukder, A., et al., "Improving electrical properties of sol-gel derived zinc oxide thin films by plasma treatment," Journal of Applied Physics 120, 155303, 2016, 24 pages.
Wang, K., et al., "Low-temperature plasma exfoliated n-doped graphene for symmetrical electrode supercapacitors," Nano Energy Journal vol. 31, Journal Issue C, Journal ID: ISSN 2211-2855, Jan. 1, 2017, 27 pages.
Summary of prior capacitively coupled and inductively coupled plasma sources—publicly used prior to of Jan. 2017.
South Dakota State University, "Reducing cost of producing supercapacitors," www.sciencedaily.com, Aug. 18, 2016, 2 pages.
"SDSU Researchers Use Biochar to Develop Cost-Effective Supercapacitors," www.azom.com, Aug. 22, 2016, 3 pages.
South Dakota State University, "Transforming biochar into activated carbon," www.sciencedaily.com, Jan. 30, 2015, 2 pages.
Simpson, J., "Plasma Etching of Biochar Reduces Supercapacitor Costs," Engineering 360, Sep. 7, 2016, 1 page.
Zeng, A., et al., "Plasma Treated Active Carbon for Capacitive Deionization of Saline Water," Journal of Nanomaterials, vol. 2017, Jul. 19, 2017, 17 pages.
Neodymium Ring Magnets—RZ0Y0X0, www.kjmagnetics.com, published Dec. 7, 2016, 6 pages.
Karpov, Dmitri A., "Arc Source Designs," Efremov Scientific Research Institute of Electrophysical Apparatus, Jan. 1995, pp. 396-423.
Schuelke, Thomas, Fraunhofer USA, Center for Coatings and Diamond Technologies, DIAMOR® Superhard, Low Friction and Wear Resistant Coating, Aug. 2015.
Fraunhofer Center for Coatings and Diamond Technologies, "Improving Powertrain Efficiency With Low-Friction Wear Resistant DIAMOR® Coatings," May 26, 2017.
Rejowski, Edney Deschauer, et al., SAE International 2012-01-1329, Application of DLC Coating in Cylinder Liners for Friction Reduction, Apr. 16, 2012.
Vetter, J., et al., "Surface Treatment Selections for Automotive Applications," Science Direct, Surface and Coatings Technology, vol. 200, Issues 5-6, Nov. 21, 2005, pp. 1962-1968.
Haubold, Lars, et al., "The influence of the surface texture of hydrogen-free tetrahedral amorphous carbon films on their wear performance," Diamond and Related Materials, vol. 19, Issues 2-3, Feb.-Mar. 2010, pp. 225-228.

* cited by examiner

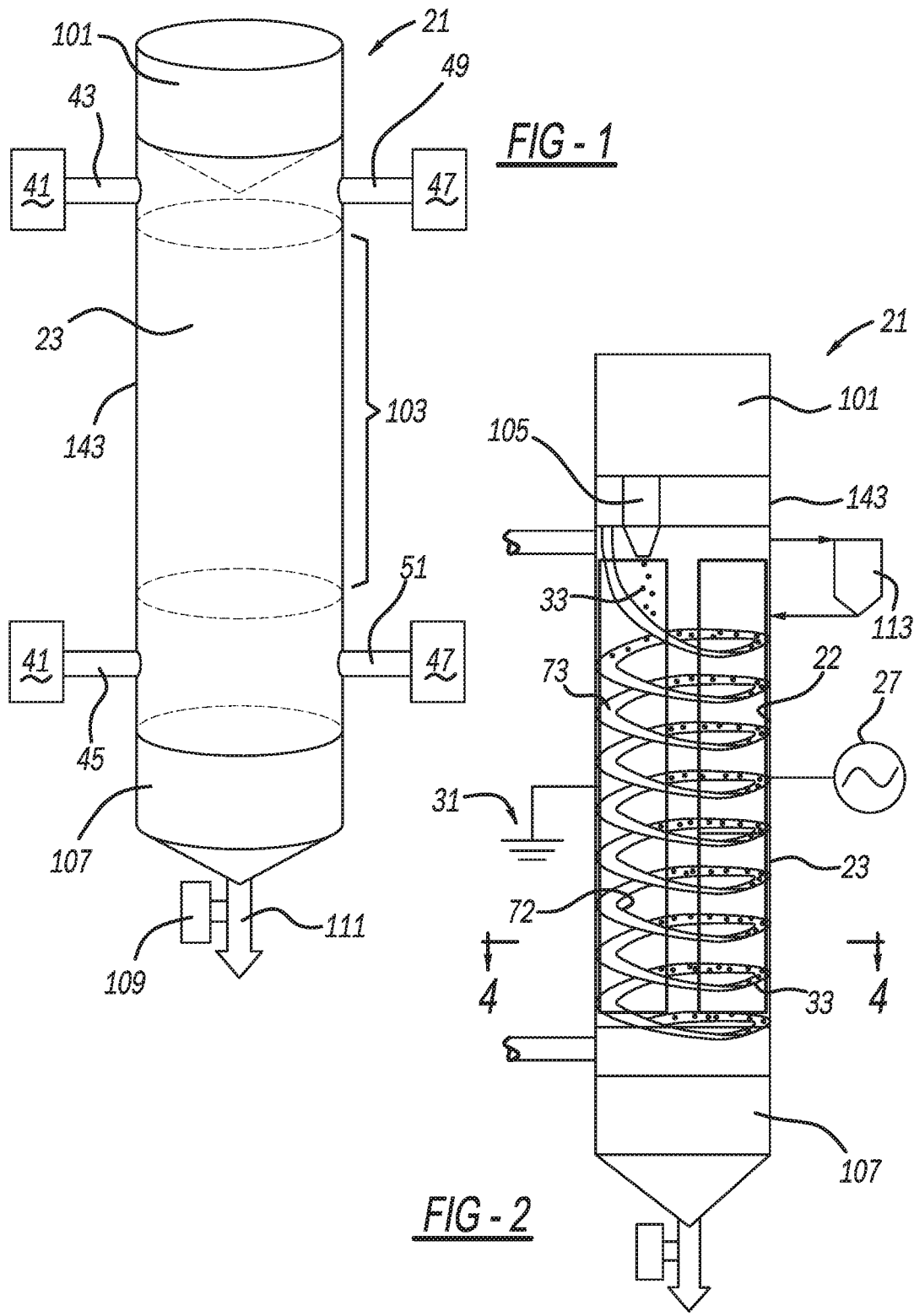

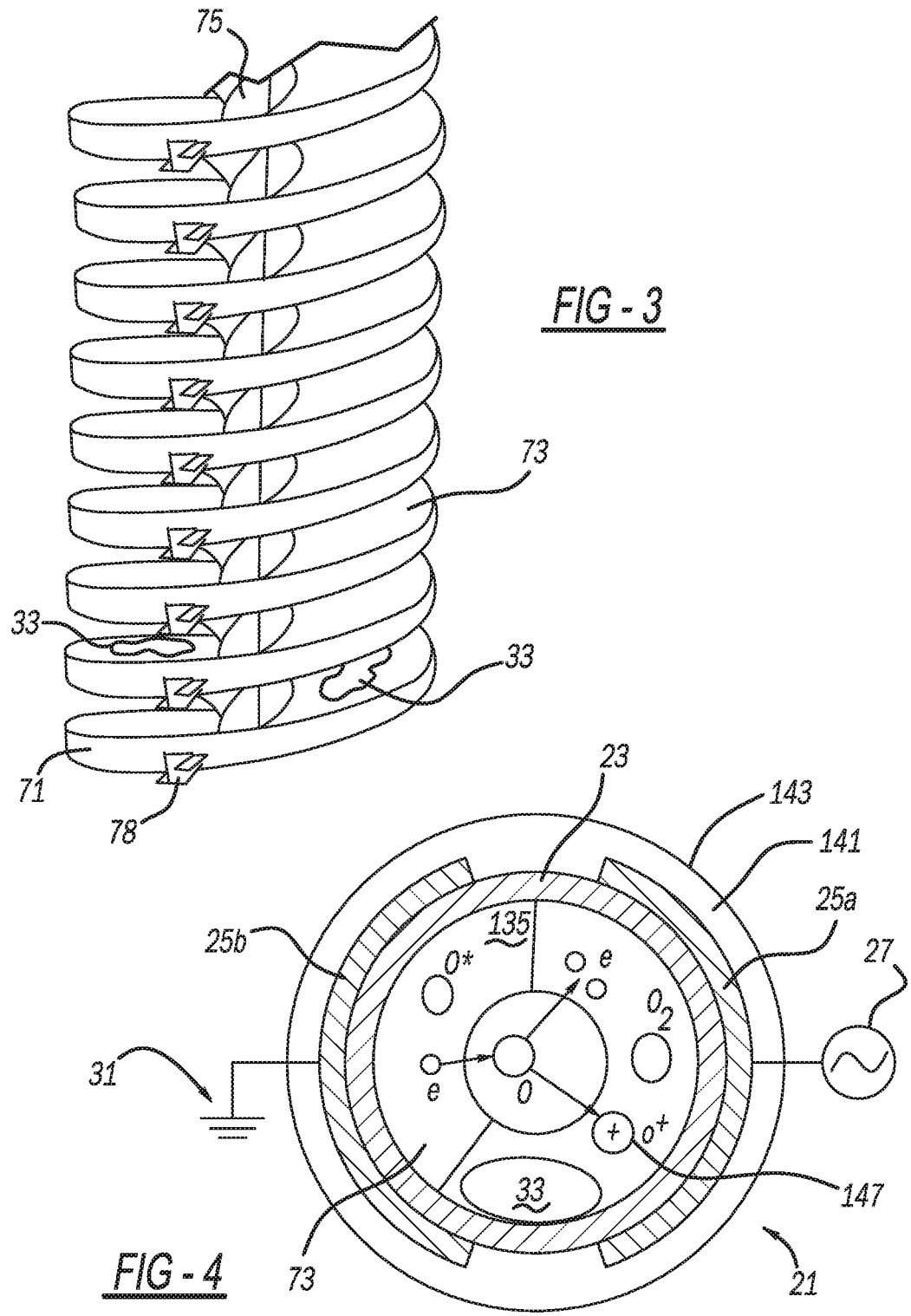

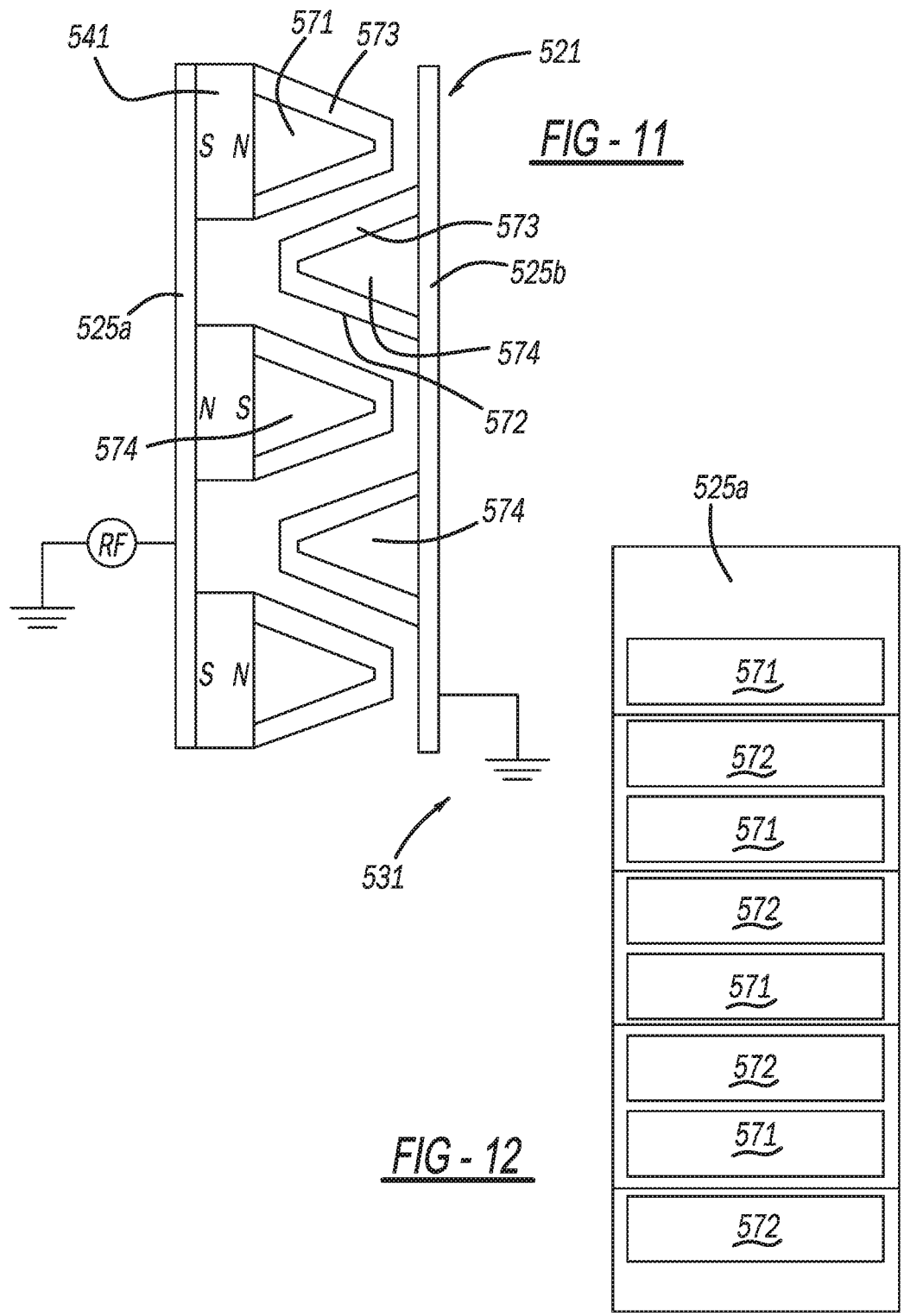

VERTICALLY ORIENTED PLASMA REACTOR

CROSS-REFERENCE OT RELATED APPLICATIONS

This application is a 371 U.S. National Phase entry of International Application No. PCT/US2019/041355, filed on Jul. 11, 2019, which claims the benefit of U.S. Provisional Patent Application No. 62/696,562, filed on Jul. 11, 2018, which are incorporated by reference herein.

GOVERNMENT SUPPORT CLAUSE

This invention was made with government support under 1700785, 1700787 and 1724941, awarded by the National Science Foundation. The government has certain rights in the invention.

BACKGROUND AND SUMMARY

This disclosure pertains generally to plasma reactors and more particularly to a vertically oriented plasma reactor.

Plasma activation of biochar material was disclosed in U.S. Pat. No. 9,754,733 entitled "Method for Plasma Activation of Biochar Material" issued to Fan (one of the co-inventors of the present application) on Sep. 5, 2017. This patent is incorporated by reference herein. While this patent is a significant advance in the industry, further improvements are now desirable.

In accordance with the present invention, a vertically oriented plasma reactor is provided. In another aspect, a plasma reactor includes a vertically elongated vacuum chamber, a wall internally projecting within a middle section of the housing, magnets, electrodes and a radio frequency source. A further aspect employs a workpiece-entry port and an opposite workpiece-exit port, with one located adjacent a top end and the other adjacent a bottom end of a vertically elongated reactor housing or vacuum chamber. Yet another aspect employs a moving or falling-bed plasma reactor for use in activating biochar material.

A further aspect uses a slide or auger which spirals around a central elongated axis along which a workpiece material, preferably biochar, travels during plasma activation. An additional aspect employs a falling bed plasma reactor including a central rod and an outer electrode, one of which is coupled to a radio frequency source and the other of which is grounded such that a primary middle vector of an internal magnetic field is generally perpendicular to an electric field within the reactor. Another aspect uses a series of overlapping and oppositely projecting baffles which create a generally serpentine flow path for a workpiece material, which is preferably biochar. A method of activating a biochar material moving in a primarily vertical direction while between offset baffles or along a spiral wall, is additionally disclosed.

The present reactor is advantageous over prior devices. For example, the present reactor can more efficiently process a higher quantity of biochar in a faster manner than can conventional horizontally oriented devices. Furthermore, some versions of the vertical arrangement of the present reactor employ gravity feeding to optimize continuous workpiece feeding within the radio frequency and plasma activation area. Some versions of the present vertically oriented plasma reactor do not require moving mechanical components, such as conventional conveyors or air blowers, within the vacuum chamber, thereby reducing complexity, cost and maintenance. Moreover, the present reactor takes up less floor space in a manufacturing factory. Additional advantages and features will be disclosed in the following description and claims as well as in the appended drawings.

BRIEF DESCRIPTION OF THE DRAWINGS

FIG. 1 is a perspective view showing a first embodiment of the present plasma reactor;

FIG. 2 is a diagrammatic side view showing the first embodiment plasma reactor;

FIG. 3 is an enlarged perspective view showing a slide/auger inside the first embodiment plasma reactor;

FIG. 4 is a cross-sectional view, taken along line 4-4 of FIG. 2, showing the first embodiment plasma reactor;

FIG. 11 is a diagrammatic view like that of FIG. 9 showing a fourth embodiment of the present plasma reactor; and FIG. 12 is a diagrammatic side view showing the fourth embodiment of the present plasma reactor.

DETAILED DESCRIPTION

Biomass, as can be obtained from decomposed cornstalks, wood or other biodegradable materials, is manufactured into biochar through a manufacturing process including pyrolysis. Pyrolysis is a thermochemical decomposition of the biomass at elevated temperatures in the absence of oxygen. The biochar usually has pores with sizes of 2-8 μm and wall thicknesses of approximated 1 μm. The biochar must therefore be activated to create activated biochar. Activation creates nanostructures with a high surface energy necessary for efficient ionic attraction and/or impurity trapping. Plasma is employed for the activation process and advantageously creates nano-porous morphology while also improving a distribution of different pore sizes which achieves a high specific capacitance. For example, plasma activated biochar includes significantly more mesopores compared with chemically activated biochar, which advantageously increases adsorption and/or ion transportation thereby leading to lower impedance and higher specific capacitance.

Figure 5:
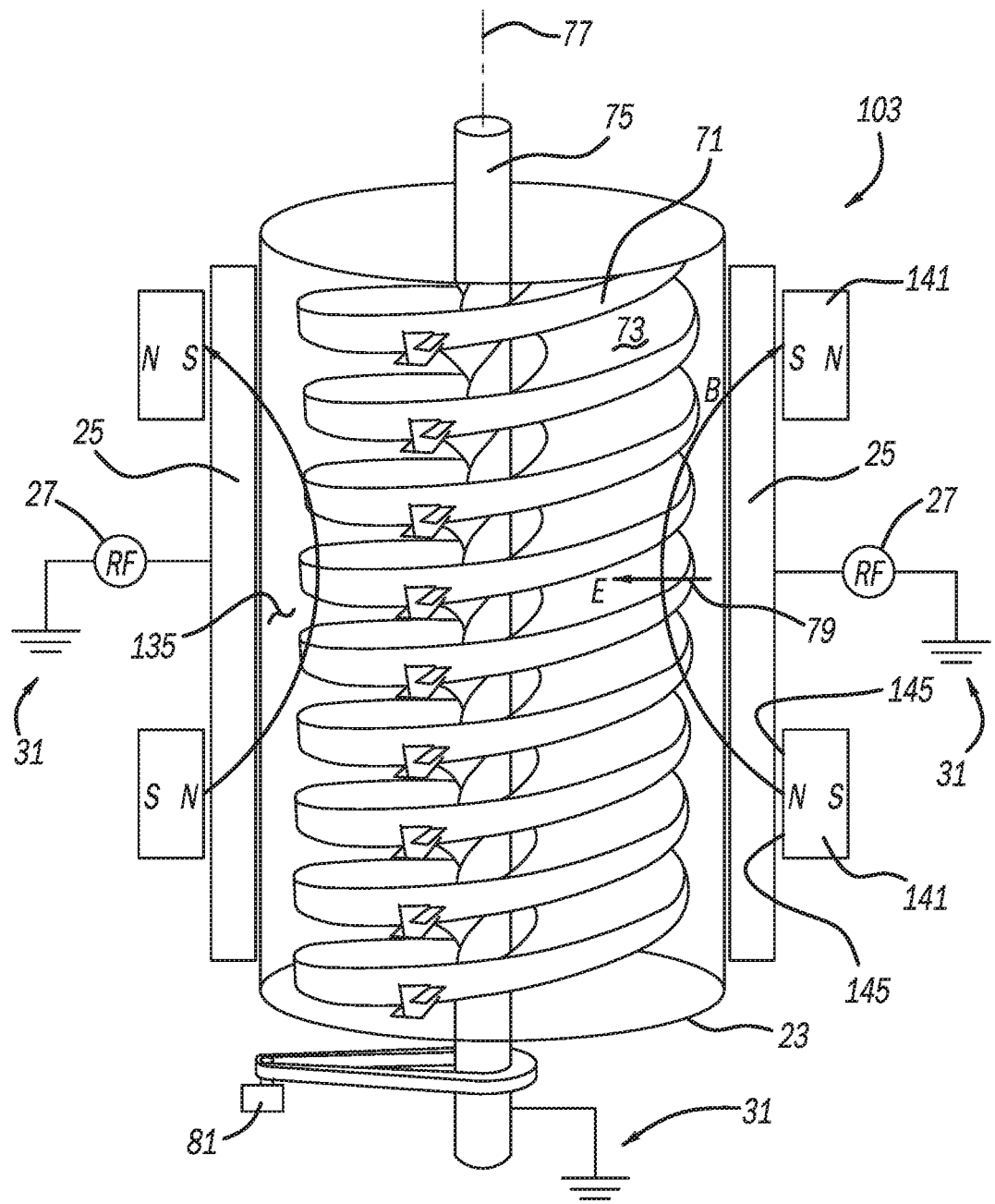
FIG. 5 is a diagrammatic perspective view showing a middle portion of the first embodiment plasma reactor.

A first embodiment of a magnetic field enhanced plasma reactor 21 is illustrated in FIGS. 1-5. This reactor includes a vertically elongated vacuum cavity 22 within a vacuum chamber 23, preferably made of rigid materials with one or more localized quartz windows. Conductive copper electrodes 25$a$ and 25$b$ are coupled or mounted adjacent to an exterior of vacuum chamber 23 in a generally semi-circular facing and clam-shell arrangement at spaced apart locations. A radio frequency ("RF") power source 27 is electrically connected to electrode 25$a$ by way of an electrical circuit. A grounding electrical circuit 31 is connected to the other electrode 25*b*. A matching network is electrically connected between electrode 25*a* and RF power source 27 and includes variable capacitors and/or inductor electronics that can be tuned to match plasma impedance with that of RF power source 27. The electrode 25*a* acts as a cathode while the electrode 25*b* connected to ground 31 acts as an anode, as is illustrated in FIGS. 2 and 4. The anode and cathode are on opposite sides of the vacuum chamber 23 and are circumferentially spaced apart from each other. Alternately, RF source 27 may be attached to both electrodes 25*a* and 25*b*, with a centrally grounded rod 75, as shown in FIG. 5, or connected vice versa.

A gas supply cylinder or tank 41 is coupled to an end of vacuum chamber 23 at either ports 43 or 45 through a mass flow controller, and a vacuum pump 47 is coupled to at least one of ports 49 and 51. A reactive gas or mixture of reactive gases flows from gas tank 41 into vacuum chamber 23 at a vacuum pressure lower than nominal ambient atmospheric pressure at sea level. Examples of such reactive gases include oxygen, hydrogen, nitrogen, argon or other inert gases, or mixtures thereof, optionally including carbon, methane, silane or metalorganic gases. Oxygen is preferably employed. It is noteworthy that low gas pressures are employed, preferably ten milliTorr to fifty milliTorr, by way of nonlimiting example.

A slide or auger 71 has a helical upper flight or wall 73 spiraling about a central post 75. Wall 73 has a continuous surface which is offset angled in a generally oblique angle from both vertical and horizontal directions 77 and 79, respectively. The offset pitch angle is between 0° and 90° and the slope angle is between 0° and 90°. Slide/auger 71 and post 75 are inwardly spaced from the cylindrically shaped vacuum chamber 23, and are retained thereto by brackets 78. If slide/auger 71 rotates relative to the stationary vacuum chamber in one construction, then the slide or auger are rotated therein via an electromagnetic or fluid powered actuator 81 and connected transmission, such as a chain and sprocket, belt and pulley, gears, or the like. But if slide 71 is stationary, then it is fixedly secured within vacuum chamber 23 and relies upon gravity to move the workpiece material in a primarily vertical and downward direction (with a helical vector), although the slide may optionally be mechanically vibrated although some of the preferred benefits may not be achieved.

In this exemplary embodiment, a feeding hopper 101 is mounted to a top end of vacuum chamber 23 above a central plasma reactor section 103. Biochar 33 is stored in hopper 101 and the desired volume is automatically dropped onto an upper end of slide 71 from a flow restricting feeding inlet 105 advantageously using gravity. A discharge section 107 is located adjacent a bottom end of plasma reactor section 103.

Activated biochar 33 falls from a lower end of slide 71 into discharge section 107, with the assistance of gravity, where it is collected and temporarily stored. A discharge valve 109 and outlet 111 allow biochar 33 to exit reactor 21. A pressure gauge 113 may be employed to monitor and control the flow of the process gas within vacuum chamber 23. Brackets, legs or other mounting structures secure plasma reactor 21 to a factory floor.

As best observed in FIG. 5, preferably a primary or majority direction of an RF electrical field vector E generated between anode and cathode electrodes 25*a* and 25*b*, is oriented in a generally horizontal or transverse direction (also denoted as 79) which is generally perpendicular to a vertical direction 77 (which is also the axis of slide/auger 71). Plasma 135 is generated between the electrodes by the RF electrical field acting upon the reactive gas using an excitation power of at least 50 watts, with a radio frequency of preferably 13.56 MHz.

Static and permanent magnets 141 are coupled or mounted adjacent to, or more preferably, outside of the internal vacuum cavity but inside an optional protective and cylindrical exterior casing 143 defining reactor 21. Each permanent magnet 141 is preferably of a large ring or annular shape with a central opening 145 therethrough. An exemplary permanent magnet material is NdFeB, grade MGO 42, with a central axial direction essentially coaxially aligned with vertical direction 77. A magnetic induction field vector B flows from one magnet 141 to the other, a majority middle segment of which is generally parallel with vertical direction 77, albeit in a slightly curved or arcuate path therebetween. In this embodiment, the majority middle segment of magnetic field vector B primarily flows in a direction generally perpendicular to a primary majority direction of RF electrical field vector E, and certainly in an offset angular direction therefrom.

The present magnetic field beneficially confines high energy electrons e (see FIG. 4) from escaping to electrodes 25. With this magnetic field enhanced plasma process and equipment, the plasma density is advantageously increased at least six times greater than without use of magnetic fields. Furthermore, the magnetic field strength with permanent magnets 141 is preferably 50-4,000 Gauss, and more preferably 100-2,000 Gauss, and even more preferably 200-2,000 Gauss. The present magnetically densified plasma beneficially speeds up the biochar activation process and therefore allows for use of a smaller sized and less expensive production vacuum chamber as compared to without use of the permanent magnets. Plasma 135 creates highly reactive species, such as ions 147, which directly contact against the workpiece material for etching, surface treatment and/or activation thereof, especially for biochar specimen 33.

A pre-heater is optionally employed to heat the biochar above room temperature but less than 500° C. The pre-heater may be adjacent the vacuum chamber or remote therefrom.

Figure 6:
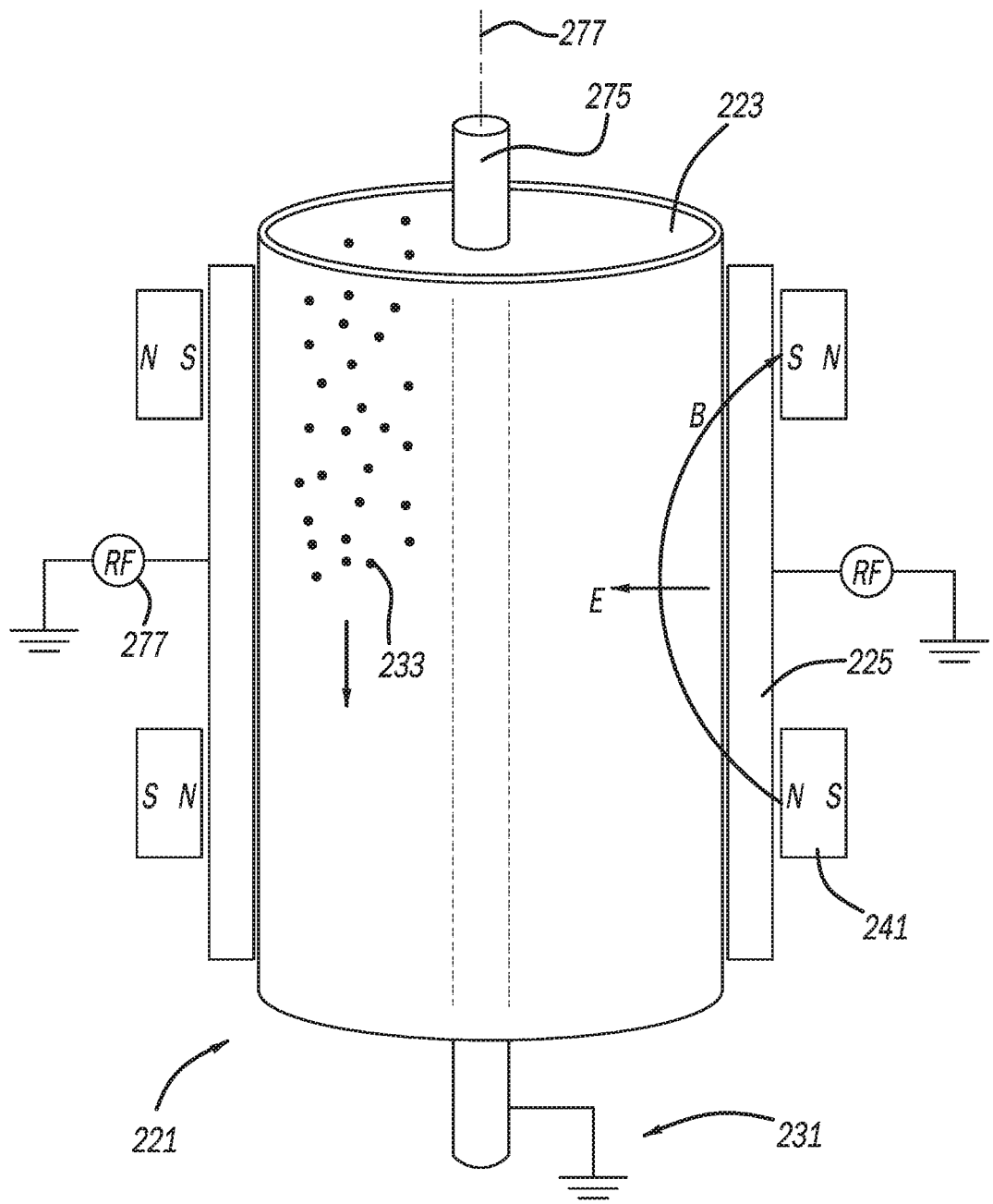
FIG. 6 is a diagrammatic perspective view showing a middle portion of a second embodiment of the present plasma reactor.

Reference should now be made to FIG. 6 showing another embodiment of a plasma reactor 221. A vacuum chamber 223, electrodes 225 and magnets 241 are similar to that of the prior embodiment. However, no slide or baffles are employed and biochar workpiece material 233 simply falls from the feed hopper and through the vacuum chamber 223, within the central openings of electrodes 225 and magnets 241, via gravity in a falling-bed manner.

FIG. 6 further illustrates a central rod 275 elongated along a vertical axial direction 277. Rod 275 may be hollow or solid and is coaxially aligned within the vertically elongated vacuum chamber and housing 223. Shaft 275 extends at least a majority of the vertically elongated distance of the vacuum chamber, and more preferable extends past both ends of the vacuum chamber and plasma reactor section of reactor 221. It is noteworthy that shaft 275 is electrically grounded at 231 which enhances the plasma creation and biochar material activation as it vertically falls through the vacuum chamber from the feeding hopper to the product discharge section. Alternately, rod 275 may only be coupled to RF source 277 and outer electrodes 225 are only connected to ground 231. With both of these electrical configurations, the FIG. 6 construction advantageously creates a magnetic field B generally perpendicular to an electrical field vector E unlike in prior devices; this perpendicular offset angled arrangement confines the electrons from escaping to the ground electrode.

Reference should now be made to FIGS. 7-10 which illustrate another configuration of a moving or falling-bed plasma reactor 321. As contrasted to the previously disclosed cylindrical housing and vacuum chamber constructions, the present exemplary embodiment has a rectangular cross-sectional or top view shape for vacuum chamber 323 in plasma reactor section 303 and also for exterior casing 343. Otherwise, a feed hopper 301, a product discharge section 307 and ports 343, 345, 349 and 351 are essentially the same as that with the previously discussed embodiments above.

Figures 7, 8:
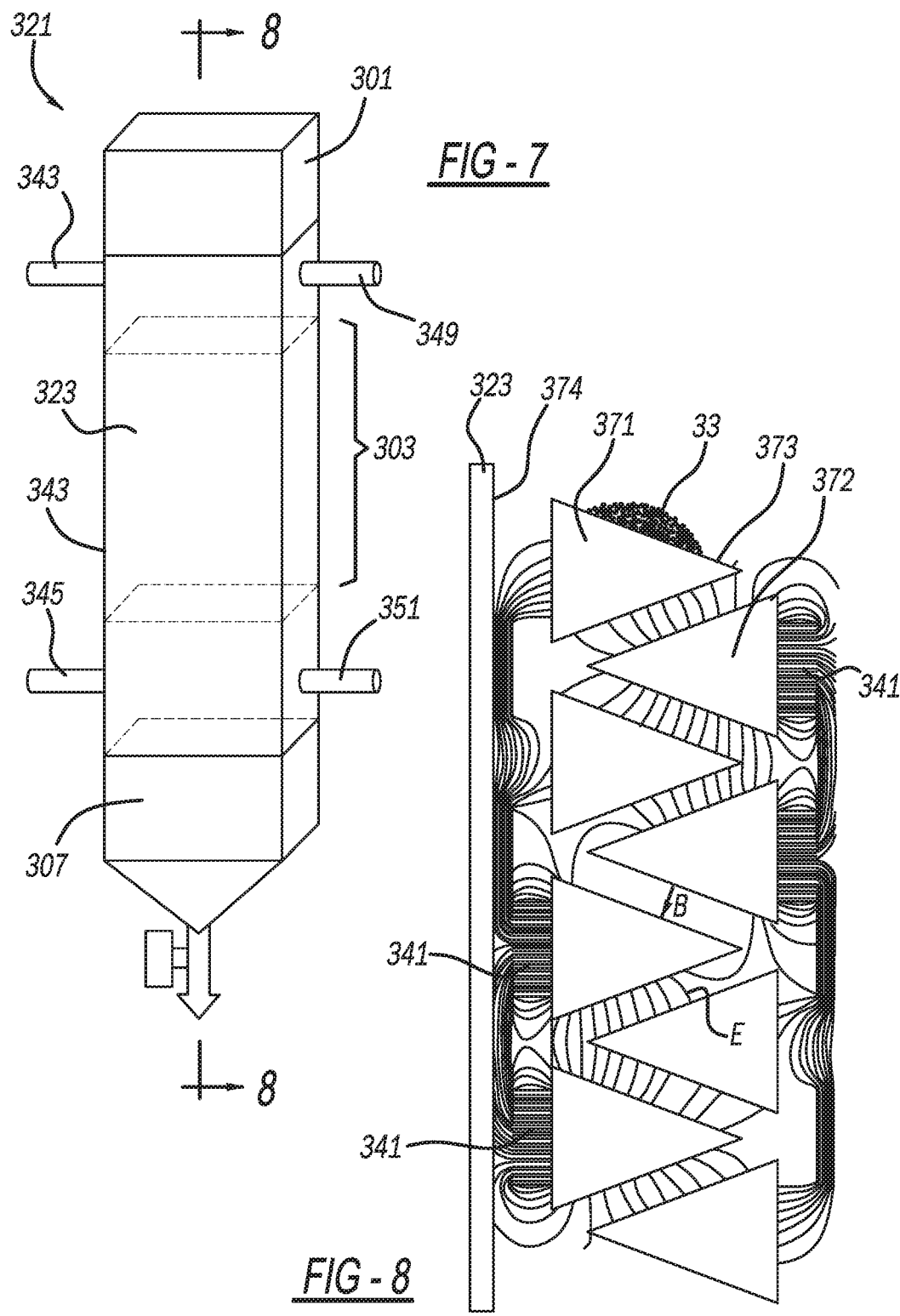
FIG. 7 is a perspective view showing a third embodiment of the present plasma reactor.
FIG. 8 is a diagrammatic longitudinal-sectional view, taken along line 8-8 of FIG. 7, showing the third embodiment plasma reactor.

A left set of baffles 371 and a right set of baffles 372 are stationarily mounted to an inside surface 374 of vacuum chamber 323. Each baffle 371 and 372 includes an upper wall surface 373 which is somewhat obliquely offset angled from the vertical and horizontal directions; preferably 30°-80° from horizontal. In FIG. 8, the baffles are illustrated as having a generally triangular shape, while in FIG. 9 they are illustrated as a truncated triangle, however, these internal baffles may alternately have a partially rounded or even obliquely angled rectangular side view shape (as viewed like that in FIGS. 8 and 9). Each of the baffles is spaced away from the adjacent baffles and narrower apex ends of the left set of baffles 371 inwardly project and point opposite that of the apex ends of the right set of baffles 372, with the left and right baffles alternating with each other.

The configuration of FIG. 8 employs permanent magnets 341 located between a wider base of each baffle 371 and interior surface 374 of vacuum chamber wall 323. Accordingly, baffles 371 and 372 are preferably folded conductive metallic sheets with end caps, which are otherwise hollow to reduce material cost and weight. Baffles 371 and 372 also act as electrodes conducting a magnetic induction field vector B essentially parallel (although somewhat curved) to the symmetrical E-field. RF electrodes may be attached to the other wall of reactor 321 or may form the outer wall of the reactor. Furthermore, the internal baffles may be RF coupled electrodes or grounded.

Figure 9:
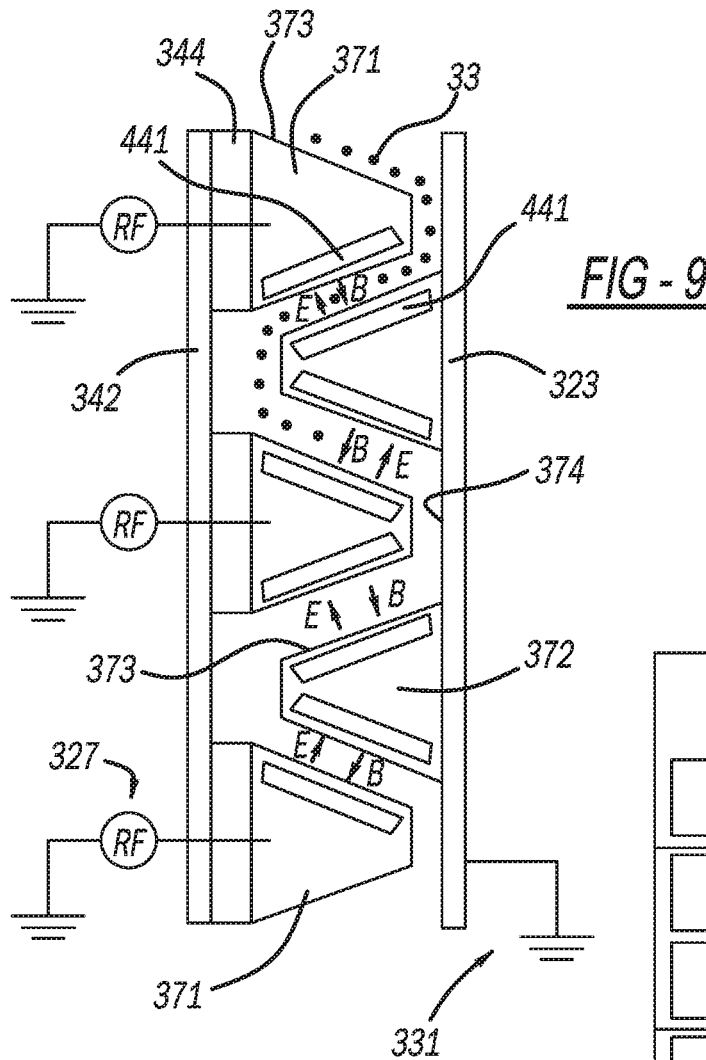
FIG. 9 is a diagrammatic view like that of FIG. 8 showing the third embodiment plasma reactor.
Figure 10:
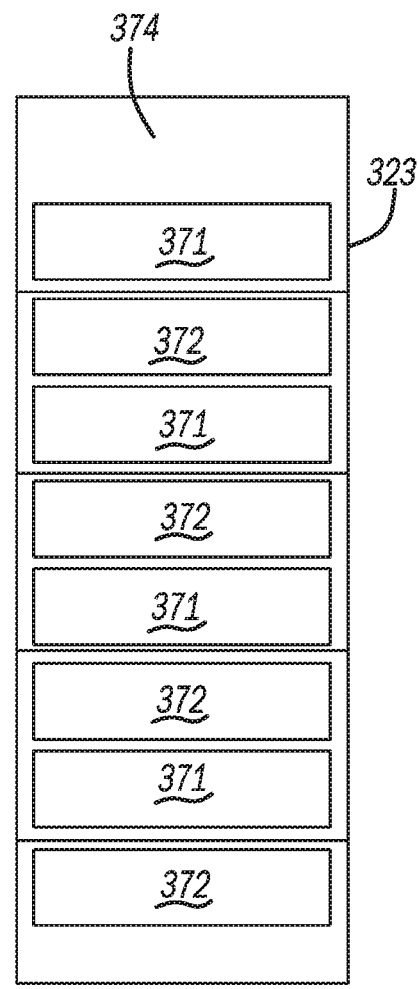
FIG. 10 is a diagrammatic side view showing the third embodiment plasma reactor.

The FIG. 9 configuration employs embedded permanent bar magnets for one along at least some of the angled walls 373. These baffles 371 and 372 also serve as electrodes connected to RF sources 327. Magnetically conductive shunts 342 and 344 are located between wider bases of baffles 371 and 372, and the corresponding vacuum chamber wall or housing. As can be observed, the uppermost and lowermost baffles may optionally contain a single internally facing magnet while the sandwiched intermediate baffles may optionally include a pair of upper and lower facing magnets behind each wall surface 373. The right side wall or housing 323 is grounded in this version.

Reference should now be made to another embodiment illustrated in FIGS. 11 and 12. This exemplary arrangement of plasma reactor 521 employs permanent magnets 541 located between a wider base of a left set of baffles 571 and a vertically elongated outer electrode 525a. Magnetically conductive metal walls 573, which are generally obliquely offset angled, include a magnetically conductive metal such as SS 416, surrounding a central void or open space 574. Insulators may optionally be placed between each left side baffle 571 and the corresponding permanent magnet 541. Right side baffles 572, however, employ conductive metallic walls 573 and hollow void spaces 574 but are directly mounted to a corresponding outer electrode 525b without a permanent magnet or insulator therebeween. Electrode 525b is electrically connected to a ground circuit 531.

With all of these stationary baffles of FIGS. 8, 9 and 11, biochar material 33 is dropped by gravity from the feeding hopper onto an uppermost offset angled but declining wall 373 of the baffle and/or electrode. Gravity further causes the biochar material to travel in a generally serpentine path between adjacent pairs of baffles/electrodes while it is being activated in the plasma reactor section under the influence of the magnetically inductive fields and the radio frequency electric fields until it reaches the product discharge section. It is advantageous that the present vertical and gravity fed arrangement of FIGS. 7-12 does not require any mechanical moving parts in the vacuum chamber in contrast to prior horizontal designs. Furthermore, for all of the embodiments disclosed herein, the present vertical arrangement requirements considerably less complex equipment since it primarily relies upon gravity feeding as compared to traditional biochar activation devices which employ complicated blowing air and gas to suspend the biochar during activation. Thus, the present magnetically and radio frequency activated plasma reactors are expected to be much less expensive and require much less maintenance while requiring less vacuum chamber length as compared to the prior blower suspension systems.

Regardless, it is alternately envisioned that a greater or lesser quantity of baffles or spiraling flights may be employed depending on the quantity of biochar to be processed, the RF and magnetic strength, and whether supplemental heating is employed or not. Moreover, alternate workpiece materials may be processed within any of the presently disclosed embodiments. These alternate workpiece materials include catalyst impregnation of solids in heterogeneous chemical gas space reactions. These alternate workpiece materials may include liquid-gas reactions in an aerosol field primarily in a non-baffled configuration. It is also envisioned that multiple plasma reactor sections 103 and/or 303 can be stacked upon each other for any of the embodiments.

While various embodiments have been disclosed, other variations are possible. For example, the permanent magnets may be replaced by helical coils [on] of wires, thereby creating inductive coil magnets. The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. It is alternately envisioned that the dependent claims are all multiply dependent on each other in some aspects of the present application. The same may also be varied in many ways. Such variations are not to be regarded as a departure from the disclosure, and all such modifications are intended to be included within the scope and spirit of the present invention.

What is claimed is:

1. A falling-bed plasma reactor comprising:
an outer housing elongated in a substantially vertical direction;
a wall internally projecting within a middle section of the housing, the wall having an upper surface offset angled relative to the vertical direction and a horizontal direction;
magnets located adjacent at least one of: the wall and the housing, the magnets being vertically spaced apart from each other;
electrodes located adjacent or being part of at least one of: the wall and the housing;
a radio frequency source configured to generate an RF electrical field within the outer housing;

a workpiece material-entry port located adjacent one of: a top end or a bottom end, of the housing; and
a workpiece material-exit port located adjacent the other of: the top end or the bottom end, of the housing opposite the entry port.

2. The reactor of claim 1, wherein the wall is part of a spiral slide which spirals around a central elongated axis substantially parallel to the vertical direction, and at least portions of the spiral slide are substantially surrounded by the magnets which are arcuate.

3. The reactor of claim 1, wherein the wall is part of a series of overlapping and oppositely projecting baffles creating a substantially serpentine workpiece-flow path therealong, and at least some of the baffles are magnetized by the magnets.

4. The reactor of claim 1, wherein one of the electrodes is a central rod which is substantially vertically elongated and laterally spaced inboard of the outer housing, and the electrodes are always spaced apart from each other.

5. The reactor of claim 4, wherein a first of the electrodes is coupled to the radio frequency source and a second of the electrodes is electrically grounded such that a primary middle vector of an internal magnetic field is substantially perpendicular to an electric field within the outer housing.

6. The reactor of claim 1, further comprising:
reactive gas flows from a gas tank into a vacuum chamber within the outer housing;
biochar being activated by plasma as it moves through the outer housing and contacts the wall; and
a magnetic field from the magnets increasing plasma density which speeds up activation of the biochar within the vacuum chamber, and strength of the magnetic field being 100-2,000 Gauss.

7. The reactor of claim 1, wherein at least one of the electrodes has an arcuate cross-sectional shape, is vertically elongated and is adjacent to the outer housing, and the electrodes being internal to the magnets.

8. A plasma reactor system comprising:
an outer housing elongated in a substantially vertical direction;
a baffle surface or slide surface internally projecting within the housing;
permanent magnets located adjacent or being part of at least one of: the baffle surface, the slide surface, and the housing;
electrodes located adjacent or being part of at least one of: the baffle surface, the slide surface, and the housing;
a material-entry port located adjacent a top end or a bottom end of the housing;
a material-exit port located adjacent one of the ends of the housing opposite the entry port; and
biochar material vertically moving within the housing between the ports, contacting the baffle surface or the slide surface, and being activated with the assistance of the magnets and the electrodes.

9. The reactor system of claim 8, further comprising a radio frequency source connected to at least one of the electrodes, and the magnets being vertically spaced apart from each other.

10. The reactor system of claim 9, wherein a first of the electrodes is coupled to the radio frequency source and a second of the electrodes is electrically grounded such that a primary middle vector of an internal magnetic field is substantially perpendicular to an electric field within the outer housing, and the electrodes are internal to the magnets.

11. The reactor system of claim 8, wherein the surface is part of a spiral slide which spirals around a central elongated axis substantially parallel to the vertical direction, and at least portions of the spiral slide are substantially surrounded by the magnets.

12. The reactor system of claim 8, wherein:
the surface is part of a series of overlapping and oppositely projecting baffles creating a substantially serpentine biochar material-flow path therealong;
at least some of the baffles are magnetized by the magnets;
a magnetic field from the magnets increasing plasma density which speeds up activation of the biochar within the vacuum chamber; and
strength of the magnetic field being 100-2,000 Gauss.

13. A plasma reactor comprising:
a vacuum chamber elongated in a substantially vertical direction;
a set of alternating baffles each having an upper surface offset angled relative to the vertical direction and a horizontal direction;
magnets located adjacent at least some of the baffles;
at least one of the baffles being coupled to or acting as an electrode; and
a workpiece material-entry port located adjacent a top end of a housing.

14. The reactor of claim 13, wherein the magnets are permanent magnets which are mounted within at least some of the baffles adjacent the upper surfaces thereof.

15. The reactor of claim 13, wherein the alternating baffles are overlapping and oppositely projecting baffles creating a substantially serpentine flow path therealong for biochar which is activated in a plasma created within the vacuum chamber, and the magnets are spaced apart from each other in a workpiece direction of flow.

16. The reactor of claim 13, further comprising:
a radio frequency source connected to at least one of the baffles; and
multiple of the baffles acting as the electrodes.

17. The reactor of claim 13, further comprising magnetically conductive shunts located between wider bases of at least some of the baffles and a wall of the vacuum chamber.

18. The reactor of claim 13, wherein the magnets are located between a wider bases of some of the baffles and a vertically elongated outer electrode.

19. The reactor of claim 13, wherein at least some of the baffles each include a lower surface and a wider base surface, the surfaces create a triangular shape with an apex facing inwardly and the base outwardly in the vacuum chamber.

20. A falling-bed plasma reactor comprising:
a vacuum chamber elongated in a substantially vertical direction;
permanent magnets located adjacent the vacuum chamber;
a central electrode located centrally within the vacuum chamber and being elongated in the substantially vertical direction;
an outer electrode located outside of the vacuum chamber and being elongated in the substantially vertical direction;
the electrodes always being spaced apart from each other;
a radio frequency source connected to at least one of the electrodes;
a biochar-entry port located adjacent a top end or a bottom end of the vacuum chamber; and
a biochar-exit port located adjacent an end of the vacuum chamber substantially opposite the entry port.

21. The reactor of claim 20, further comprising a spiral slide which spirals around the central electrode, at least a portion of the spiral slide and the central electrode being substantially surrounded by the outer electrode and the magnets.

22. The reactor of claim 21, wherein the slide is part of a rotatable auger.

23. A method of using a plasma reactor, the method comprising:
(a) vertically moving workpiece material through a vacuum chamber from an upper inlet to a lower outlet;
(b) moving the workpiece material along a declining baffle wall or slide wall during step (a);
(c) supplying magnetism to the wall with a permanent magnet;
(d) supplying a radio frequency within the vacuum chamber; and
(e) creating a plasma within the vacuum chamber.

24. The method of claim 23, further comprising using a first electrode coupled to a radio frequency source and a second electrode electrically grounded to create a primary middle vector of an internally magnetic field that is substantially perpendicular to an electric field in the vacuum chamber, the wall acting as or being coupled to one of the electrodes.

25. The method of claim 23, further comprising activating the workpiece material which is biochar, and the moving occurring along upper surfaces of multiples of oppositely projecting of the baffle walls within the vacuum chamber and within the plasma.

26. The method of claim 25, wherein at least one of the baffle walls is coupled to or acts as an electrode.

27. The method of claim 23, further comprising another magnet, the magnets being vertically spaced apart from each other, and moving the workpiece material through or past both of the magnets.

28. The reactor of claim 1, wherein the internally projecting wall is part of a series of spaced apart internal baffles, and at least one of the baffles is coupled to or acts as an electrode.

* * * * *